(12) United States Patent
Lee et al.

(10) Patent No.: US 11,257,401 B2
(45) Date of Patent: Feb. 22, 2022

(54) ELECTRONIC APPARATUS FOR DISPLAYING CONTENT ASSOCIATED WITH APPLICATION AND CONTROL METHOD THEREOF

(71) Applicant: LG ELECTRONICS INC., Seoul (KR)

(72) Inventors: Juhye Lee, Seoul (KR); Shinhui Ahn, Seoul (KR); Euitaek Oh, Seoul (KR); Sangyoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/796,777

(22) Filed: Feb. 20, 2020

(65) Prior Publication Data

US 2021/0201709 A1    Jul. 1, 2021

(30) Foreign Application Priority Data

Dec. 31, 2019  (WO) ................ PCT/KR2019/018787

(51) Int. Cl.
*G09F 9/30* (2006.01)
*G09G 5/373* (2006.01)
*G06F 1/16* (2006.01)

(52) U.S. Cl.
CPC ............ *G09F 9/301* (2013.01); *G06F 1/1652* (2013.01); *G09G 5/373* (2013.01); *G09G 2340/0442* (2013.01); *G09G 2340/0464* (2013.01); *G09G 2340/14* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2016/0196057 A1* | 7/2016 | Choi .................. | G06F 3/04883 |
| | | | 715/773 |
| 2017/0140504 A1* | 5/2017 | Jeong ........................ | G06T 3/40 |
| 2019/0033984 A1 | 1/2019 | Seo et al. | |
| 2019/0065031 A1* | 2/2019 | Kang .................... | G06F 3/0482 |
| 2020/0326900 A1* | 10/2020 | Kwon .................. | G06F 3/1446 |

FOREIGN PATENT DOCUMENTS

| | | |
|---|---|---|
| KR | 101725247 | 4/2017 |
| KR | 1020170058816 | 5/2017 |
| KR | 101789625 | 10/2017 |
| KR | 1020190021142 | 3/2019 |

OTHER PUBLICATIONS

PCT International Application No. PCT/KR2019/018787, International Search Report dated Sep. 17, 2020, 5 pages.

* cited by examiner

*Primary Examiner* — Nurun N Flora
(74) *Attorney, Agent, or Firm* — Lee, Hong, Degerman, Kang & Waimey PC

(57) ABSTRACT

Disclosed is an electronic apparatus including a flexible display of which at least a portion is located at a first surface of the electronic apparatus and a first-surface exposed display size is changed, and a controller configured to display, when a first input corresponding to a first icon is received, content corresponding to at least one application of an application set corresponding to the first icon on the display based on layout information and application set information of the application set in response to the first input.

20 Claims, 16 Drawing Sheets

ELECTRONIC APPARATUS FOR DISPLAYING CONTENT ASSOCIATED WITH APPLICATION AND CONTROL METHOD THEREOF

CROSS-REFERENCE TO RELATED APPLICATION

Pursuant to 35 U.S.C. § 119(a), this application claims the benefit of earlier filing date and right of priority to PCT International Application No. PCT/KR2019/018787, filed on Dec. 31, 2019, the contents of which are hereby incorporated by reference herein in its entirety.

BACKGROUND

1. Field

This disclosure relates to an electronic apparatus for displaying content associated with at least one application and a control method thereof, and one particular implementation relates to a method of displaying content corresponding to at least one application of an application set based on application set information and layout information, and an electronic apparatus therefor.

2. Description of the Related Art

Advances of network technologies and expansions of infrastructures have enabled an electronic device to perform various tasks. With such technological advances, it is required to perform various tasks simultaneously using a plurality of applications in parallel in a certain situation.

To use the plurality of applications in parallel, a screen having a size sufficiently large to display content on each of the applications is required. As such, a desire for an electronic device that provides a large screen has been also increasing.

However, a display providing a large screen may increase in size in proportion to a size of a screen. Thus, it is necessary to consider a portability along with a size of the display in terms of an electronic device of which the portability is emphasized, such as a mobile terminal.

For this, it can be considered a method to selectively change a size of a display by applying a flexible display to the electronic device. Accordingly, there is a desire for a method to effectively provide content associated with content in response to a display changing in size.

SUMMARY

An aspect provides an electronic apparatus for effectively providing content corresponding to at least one application of an application set based on application set information and layout information, and a control method thereof.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a flexible display of which at least a portion is located at a first surface of the electronic apparatus and a first-surface exposed display size is changed, and a controller configured to display, when a first input corresponding to a first icon is received, content corresponding to at least one application of an application set corresponding to the first icon on the display based on layout information and application set information of the application set in response to the first input.

According to another aspect, there is also provided a control method of an electronic apparatus including a flexible display of which at least a portion is located at a first surface of the electronic apparatus and a first-surface exposed display size is changed, the method including receiving a first input corresponding to a first icon, identifying layout information and application set information of an application set corresponding to the first icon based on the first input, and displaying content corresponding to at least one application of the application set on the display based on the layout information and the application set information.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
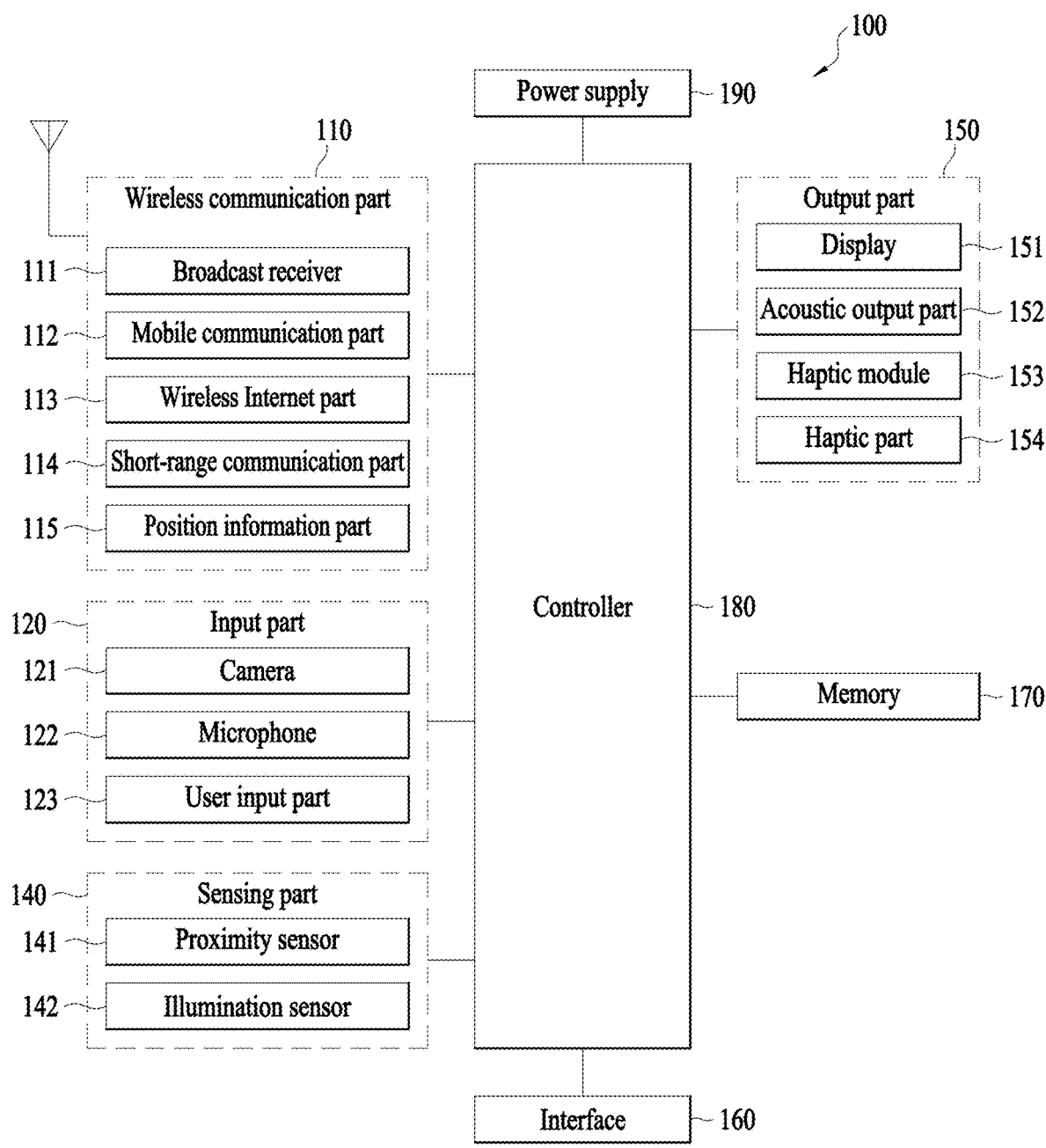
FIG. 1 is a block diagram illustrating an electronic apparatus related to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

The electronic apparatus 100 may include a wireless communication part 110, an input part 120, a sensing part 140, an outer part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the electronic apparatus 100, surrounding environment information of the electronic apparatus 100, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the electronic apparatus 100 may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the electronic apparatus 100 according to various embodiments as described below. Also, the operation, control, or control method of the electronic apparatus 100 may be implemented on the mobile terminal through an execution of at least one application program stored in the memory 170.

In the present disclosure, the electronic apparatus 100 may include a mobile terminal obtained by applying a flexible display to the above-described electronic apparatus 100. The flexible display may include a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may include an antenna including a transparent film in which a patterned electrode layer and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise stated.

Figure 2:
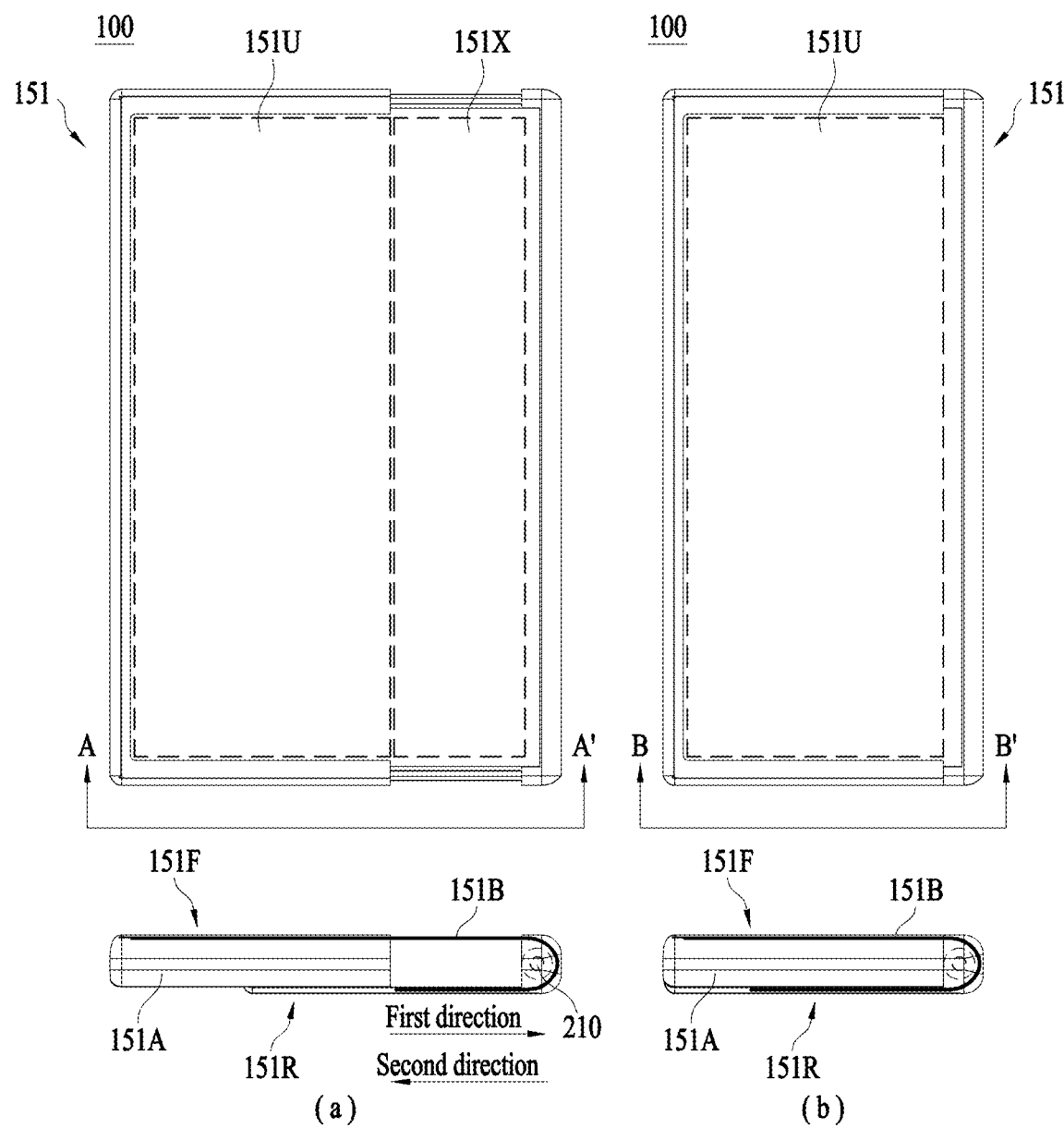
FIGS. 2 and 3 illustrate views obtained before and after an expansion of a display of an electronic apparatus related to the present specification.
Figure 3:
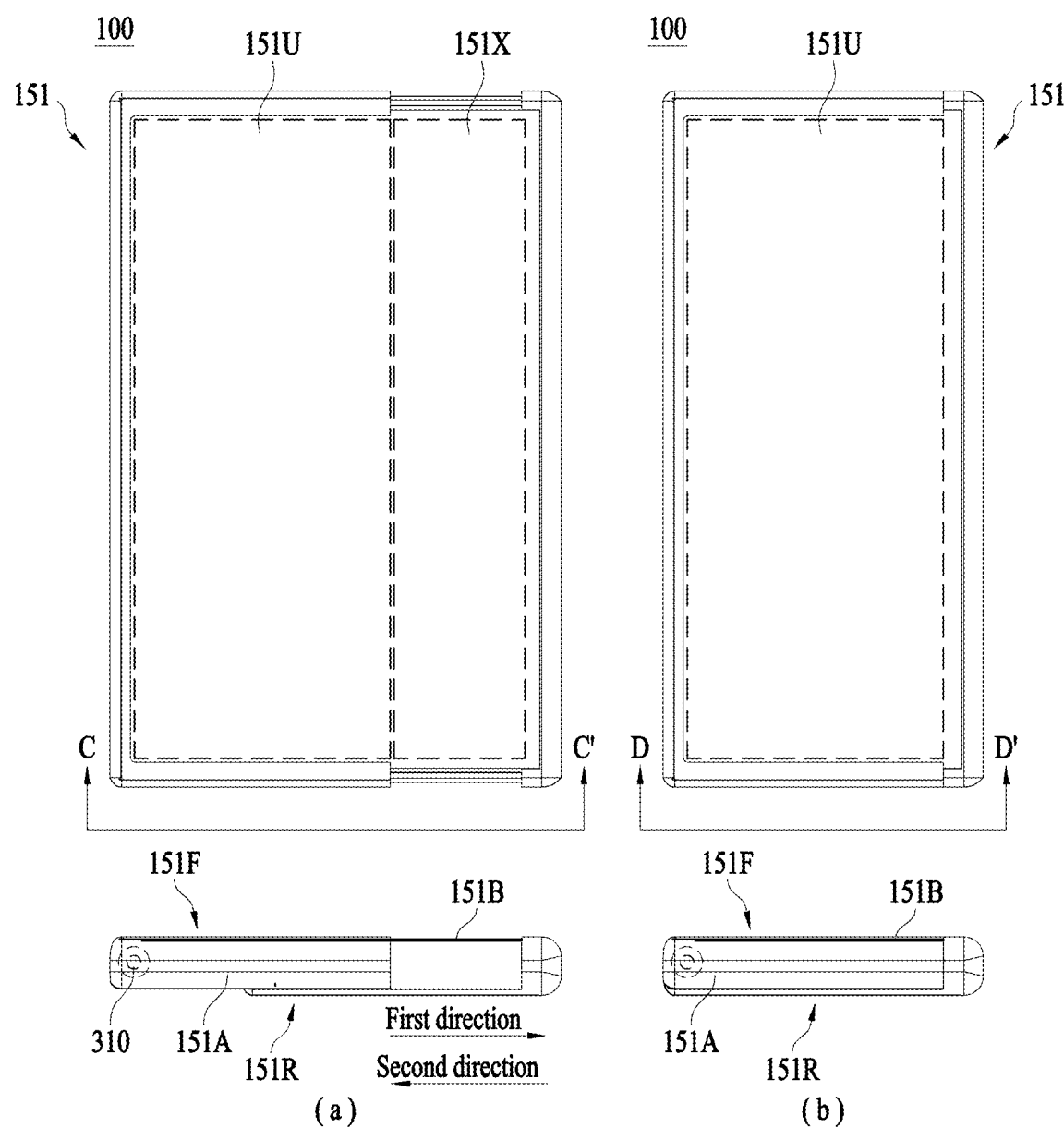

FIGS. 2 and 3 are conceptual diagrams illustrating the states before and after an expansion of a display 151 of an electronic apparatus 100 related to an example embodiment of the present disclosure.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates an electronic apparatus 100 with the display 151 which is extended, and (b) in FIG. 2 illustrates the electronic apparatus 100 with the display 151 which is not extended.

Referring to FIG. 2, the display 151 may have one side fixed at a front surface with reference to the electronic apparatus 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state that the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed at the front surface. When the second frame 151B slidably moves in a direction opposite to the first direction to be retracted toward the first frame 151A, the front region 151F of the display 151 may be reduced as well, causing only the fixed part 151U to remain exposed at the front surface.

The rear region of the display 151 may be exposed at a rear surface of the second frame 151B. The rear region of the display 151 may be covered by a light-transmitting rear window and therefore visible from the outside.

Meanwhile, the front region 151F of the display 151 may be exposed at a front surface without an additional window. In some cases, however, a deco frame may cover a boundary region between the front region 151F and the first frame 151A, thereby preventing an external material and covering a bezel region of the electronic apparatus to help visibility of a screen for a user.

An electronic part may be formed in an inner surface formed by external structures such as the first frame 151A and the second frame 151B. An electronic component for driving the electronic apparatus 100, such as a battery 191, may be mounted at a main Printed Circuit Board (PCB) and thus provided in the electronic part. Alternatively, an electronic component such as an internal antenna module may be mounted directly at the electronic part rather than mounted at the main PCB.

In an embodiment, the electronic apparatus 100 may include a driving part for controlling a size of the display 151. The driving part may be implemented, for example, using a motor. The electronic apparatus 100 may control a size of the display 151 by controlling a moving direction of the first direction edge 210 of the display 151 using a motor.

Specifically, FIG. 3A illustrates an electronic apparatus 100 with a display 151 which is extended, and FIG. 3B illustrates the electronic apparatus 100 with the display 151 which is not extended.

Referring to FIG. 3, the display 151 may have one side fixed at a front region with reference to the electronic apparatus 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain in the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
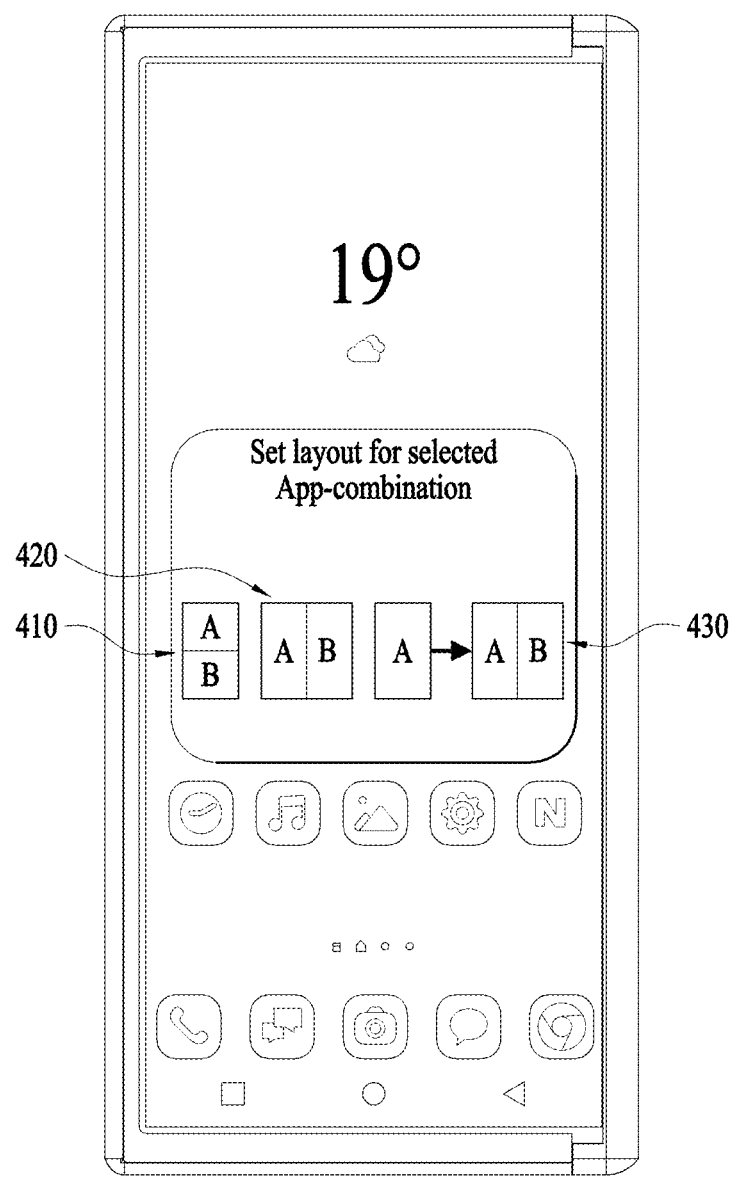
FIG. 4 is a diagram illustrating layout information of an electronic apparatus according to an example embodiment of the present disclosure.

FIG. 4 is a diagram illustrating layout information of an electronic apparatus according to an example embodiment of the present disclosure.

Referring to FIG. 4, an electronic apparatus may provide layout information related to a layout of content related to an application. In response to an input for the provided layout information being received, the electronic apparatus may display the content related to the application based on the layout information corresponding to the input.

As illustrated in FIG. 4, the layout information may include first layout information 410, second layout information 420, and third layout information 430. The first layout information 410 may include information on a layout in which a screen is split into two portions, upper and lower portions when a display is in a first size. The second layout information 420 may include information on a layout in which the screen is split into two portions, left and right portions when the display is in a second size. The third layout information 430 may include information on a layout in which the screen is split from one portion into two portions when the display is changed from the first size to the second size.

In the example embodiment, when an input to select one of the first layout information 410, the second layout information 420, and the third layout information 430 is received, the electronic apparatus may display content related to an application based on layout information corresponding to the received input.

The first layout information 410, the second layout information 420, and the third layout information 430 are merely an example, and the present embodiment is not limited to the example. Also, content related to an application to be displayed based on layout information will be described later.

Figure 5:
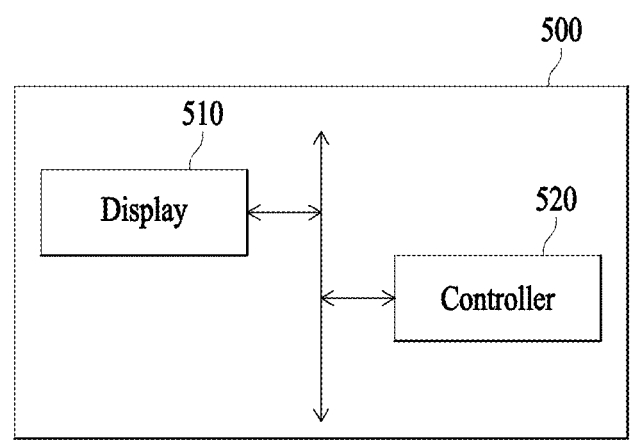
FIG. 5 is a functional block diagram illustrating an electronic apparatus according to an example embodiment of the present disclosure.

FIG. 5 is a functional block diagram illustrating an electronic apparatus according to an example embodiment of the present disclosure. As described below, an element of an electronic apparatus 500 may be a unit that processes at least one function or operation and may be implemented through hardware, software, or a combination of hardware and software.

Referring to FIG. 5, the electronic apparatus 500 may include a display 510 and a controller 520.

The display 510 may be provided such that a size by which the display 510 is exposed on a first surface of the electronic apparatus 500 (e.g., a front surface of the electronic apparatus 500) is changed. The display 510 may be implemented to be flexible.

The display 510 may display a variety of information associated with an operation of the electronic apparatus 500. The variety of information may include, for example, content related to an application executed in the electronic apparatus 500.

In the example embodiment, a portion of the display 510 may be located at the first surface. Also, another portion of the display 510 may be wound at one surface of the electronic apparatus 500 to be located at a second surface of the electronic apparatus 500. Here, the second surface may include a rear surface of the electronic apparatus 500 facing the first surface.

Specifically, the display 510 may be bent at one end in contact with the first surface, so that at least a portion of the display 510 is located at the first surface and at least another portion of the display 510 is located at the second surface in contact with the one end. Since the related description has been made with reference to FIG. 2 or 3, repeated description is omitted.

The controller 520 may receive a first input corresponding to a first icon. Here, the first icon may be an icon that executes at least one application included in an application set. For example, when the application set includes a first application and a second application, the first application and the second application may be executed in parallel in response to the first icon receiving an input.

In one example, the controller 520 may provide the first icon by changing an icon corresponding to an application included in the application set to the first icon. In another example, the controller 520 may newly generate the first icon based on information on the application set and provide the generated first icon. In this case, the icon corresponding to the application included in the application set may be maintained.

When the first input corresponding to the first icon is received, the controller 520 may display content corresponding to at least one application of the application set on the display 510 based on layout information and application set information corresponding to the first icon.

When the first input is received, the controller 520 may display content of at least one application of the application set corresponding to the first icon on the display 510 based on the layout information corresponding to the first icon. Here, the content may include content of an application provided based on the application being executed.

The layout information may include at least one of information on a variety of layouts. In the example embodiment, the layout information may include one of first layout information, second layout information, and third layout information.

In a case in which the application set corresponding to the first icon includes the first application and the second application, based on a size of the display 510 exposed on the first surface being a first size, the first layout information may include, for example, information indicating that content related to the first application and content related to the second application are displayed up and down or left and right on the display 510 in the first size. Here, the first size may correspond to a size of the display 510 before expansion.

In the case in which the application set corresponding to the first icon includes the first application and the second application, based on a size of the display 510 exposed on the first surface being a second size (the second size greater than the first size), the second layout information may include, for example, information indicating that content related to the first application and content related to the second application are displayed up and down or left and right on the display 510 in the second size. Here, the second size may correspond to a size of the display 510 after expansion but not be limited thereto.

In the case in which the application set corresponding to the first icon includes the first application and the second application, when a size of the display 510 is the first size, the third layout information may include, for example, information indicating that content related to the first application is displayed in at least a portion of the display 510.

When the size of the display 510 is the second size, the third layout information may include information indicating that each of the content related to the first application and the content related to the second application is displayed in at least a portion of the display 510. In some cases, an area in which the content related to the second application is displayed may correspond to an area corresponding to an extended portion of the display 510.

In the example embodiment, the controller 520 may increase a size of the display 510 exposed on the first surface based on the layout information. Specifically, when the size of the display 510 included in the layout information includes information associated with a size of an expanded display (e.g., the second layout information or the third layout information), the controller 520 may expand the display 510 based on the layout information.

In the example embodiment, the controller 520 may increase the size of the display 510 based on a reception of an additional input related to a display expansion. For example, when the additional input is received, the controller 520 may expand the display 510 exposed on the first surface based on the additional input. The controller 520 may display content corresponding to the second application included in the application set in at least a portion of an area corresponding to an extended display.

In the example embodiment, when a second input corresponding to the first icon is received, the controller 520 may display content corresponding to a predetermined application of the application set, on the display. Here, the second input may include an input designated for displaying content corresponding to the specific application of the application set.

In the example embodiment, the display 510 may include a first area and a second area. In this case, the controller 520 may display the content corresponding to the first application of the application set in the first area based on the layout information. The controller 520 may select one of applications of the application set as the second application based on an execution time corresponding to the first application and a number of execution times corresponding to the first application. The controller 520 may display the content corresponding to the second application in the second area based on the layout information.

As an example, when the application set includes the first application and a plurality of applications, the second application selected by the controller 520 from the plurality of applications may be an application of which an execution time corresponding to the first application is greater than an execution time corresponding to the third application. The execution time corresponding to the first application may be a time in which an application related to the first application is executed and include, for example, a time in which the application is executed along with the first application and a time in which the application is executed before and after the first application is executed.

As another example, when the application set includes the first application and a plurality of applications, the second application selected by the controller 520 from the plurality of applications may be an application of which the number of execution times corresponding to the first application is greater than an execution time corresponding to the third application. The number of execution times corresponding to the first application may be the number of times that the application related to the first application is executed and include, for example, the number of times that the application is executed along with the first application or the number of times that the application is executed before and after the first application is executed.

In the example embodiment, the controller 520 may identify a specific input related to the second area while the content corresponding to the second application is displayed in the second area. In this case, the controller 520 may display content corresponding to the third application in the second area. In other words, the second application displayed in the second area may be changed to the content corresponding to the third application. However, embodiments are not limited thereto. In some cases, the content corresponding to the second application and the content corresponding to the third application may be displayed together.

The specific input related to the second area may include, for example, a touch input (e.g., double-tapping and long-tapping) to a predetermined position in the second area. Also, the specific input related to the second area may include an input to specific content or icon displayed on the display 510.

In the example embodiment, when the application set includes four applications, that is, when the application set further includes a fourth application, one of the third application and the fourth application may be determined based on at least one of the execution time corresponding to the first application and the number of execution times corresponding to the first application in response to the specific input related to the second area being received. The determined application may be displayed in the second area.

In other words, the second application, the third application and the fourth application may be displayed in the second area in an order determined based on at least one of the execution time corresponding to the first application and the number of execution times corresponding to the first application. Related description will be made with reference to FIG. 12.

In the example embodiment, the layout information may include information on a screen split based on an input to the display 510. In this case, the controller 520 may determine the layout information based on the input to the display 510 and display content corresponding to at least a portion of applications of the application set based on the determined layout information.

Specifically, the input to the display 510 may include an input for setting a size of a portion of areas of the screen. The input may be generated based on splitting of the screen. For example, the input to the display 510 may include a drag input moving from a first point to a second point on the display 510. In this case, a size of the area of the screen may be set based on a length by which the drag input moves. Related description will be made with reference to FIGS. 13 through 16.

In the example embodiment, the application set may be determined in advance. Specifically, when the application set includes the first application and the second application, the first application may be determined based on the second input corresponding to the second icon related to the first application. For example, when a specific input is applied to an icon representing a specific application, the controller 520 may determine the specific application to be the first application.

In the example embodiment, the controller 520 may provide a user interface to correspond to the second input. The user interface may provide information associated with various applications related to the first application. The information provided in the user interface may include an icon representing each of the various applications. In this case, the second application may be determined in response to a third input being applied to select an icon included in the user interface.

In some cases, the third input may include an input for selecting a plurality of applications. In such cases, the application set may include a plurality of applications, for example, the second application and the third application corresponding to the input in addition to the first application.

Figure 6:
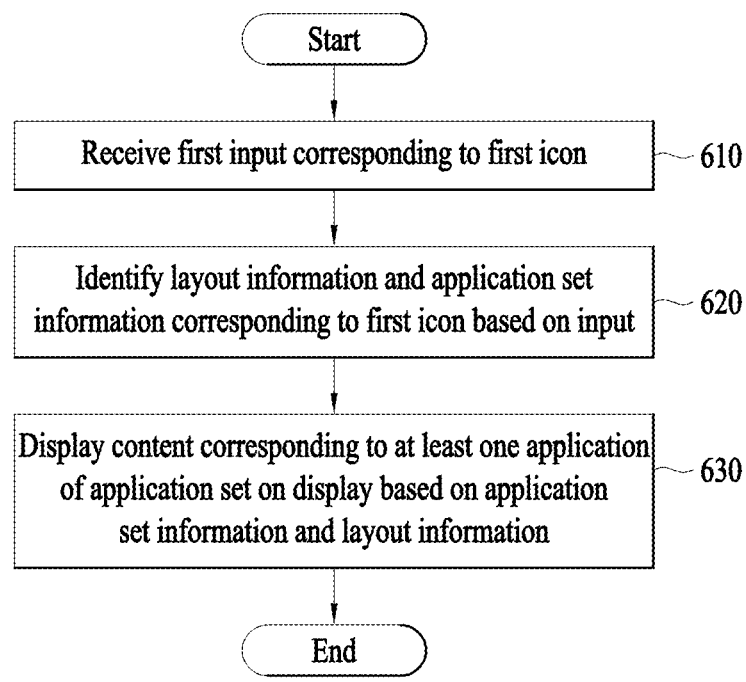
FIG. 6 is a flowchart illustrating a control method of an electronic apparatus according to an example embodiment of the present disclosure.

FIG. 6 is a flowchart illustrating a control method of an electronic apparatus according to an example embodiment of the present disclosure. As would be apparent to one skilled in the art, in some cases, operations of FIG. 6 may be performed in a different order from that shown in the drawing.

In operation 610, the electronic apparatus may receive a first input corresponding to a first icon. The first icon may be an icon based on setting to enable a plurality of applications (e.g., the first application and the second application) to be executed in parallel.

In operation 620, the electronic apparatus may identify layout information and application set information corresponding to the first icon corresponding to the first input. Specifically, when the first input corresponding to the first icon is received, the electronic apparatus may identify layout information and application set information previously set to correspond to the first icon.

Here, the application set information may include information on combinations of a plurality of applications set to be executed in parallel. The layout information may include information for displaying content related to at least one of the plurality of applications indicated by the application set information on the display.

In operation 630, the electronic apparatus may display content corresponding to at least one application of the application set on the display based on the application set information and the layout information.

Specifically, the electronic apparatus may display content related to at least one of the plurality of applications included in the application set on the display based on a display layout indicated by the layout information.

For example, when the layout information includes information for vertically arranging content related to each of the plurality of applications on a display having a first size, the electronic apparatus may control a size of the display to be the first size and display the content related to each of the plurality of applications through a vertical arrangement. Examples related to the layout information will be described with reference to FIGS. 7 through 9.

Figure 10:
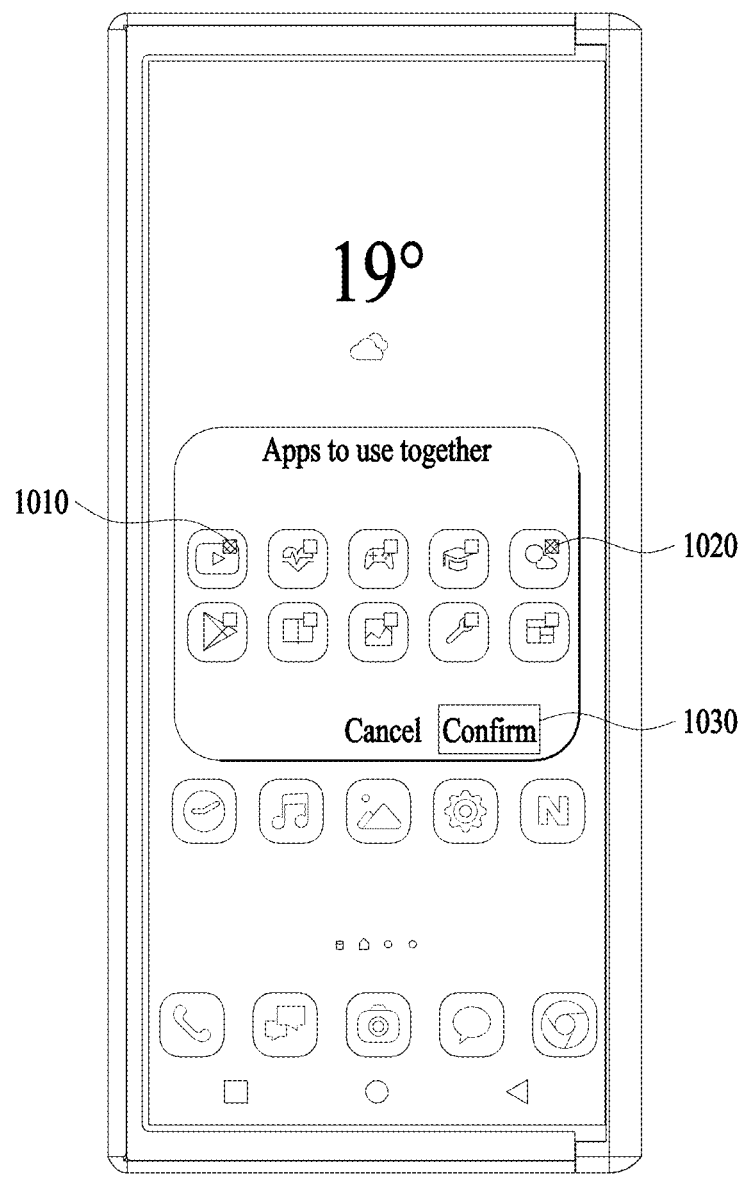
FIG. 10 is a diagram illustrating an example of a screen provided to select an application related to content displayed based on layout information in an electronic apparatus according to an example embodiment of the present disclosure.

The application set indicated in the application set information and the layout information related thereto may be set in advance. For example, in response to a specific input being applied, the electronic apparatus may provide a layout setting screen as illustrated in FIG. 4 and determine layout information based on the input. In a case of the application set, the electronic apparatus may provide a screen as illustrated in FIG. 10 and determine an application set based on a corresponding input.

Figure 7:
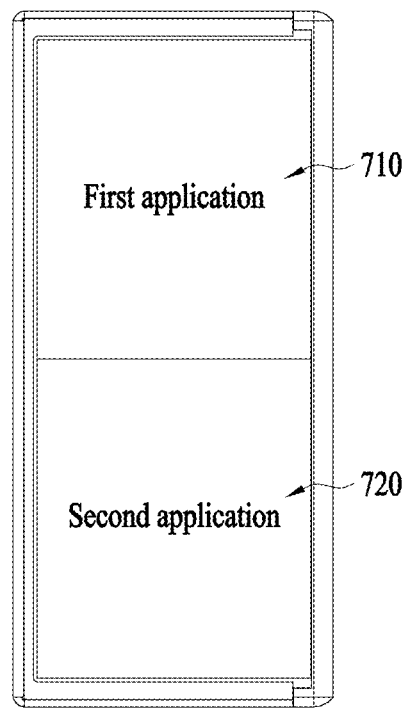
FIG. 7 is a diagram illustrating an example of layout information of an electronic apparatus according to an example embodiment of the present disclosure.

FIG. 7 is a diagram illustrating an example of layout information of an electronic apparatus according to an example embodiment of the present disclosure. Specifically, FIG. 7 illustrates an example of a screen of a display on which content related to each of a plurality of applications included in an application set is displayed. The example of FIG. 7 may correspond to the first layout information of FIG. 5.

The application set may include a first application and a second application. Layout information may include information for displaying content 710 related to a first application and content 720 related to a second application up and down when a size of the display is a first size.

Here, the first application may be a main application and the second application may be a sub-application set for the main application. However, embodiments are not limited thereto. Also, the first size of the display may correspond to a size of the display before expansion but not be limited thereto.

Figure 8:
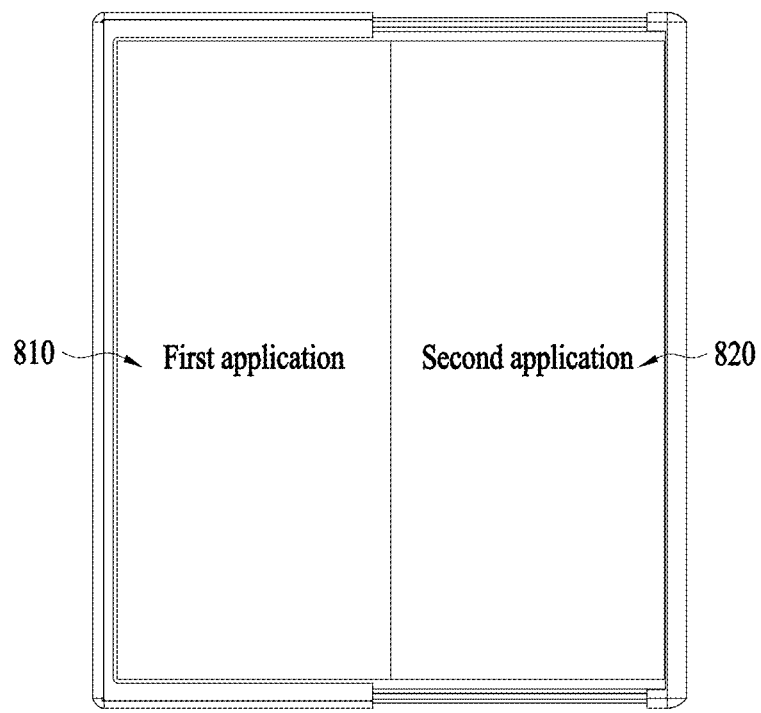
FIG. 8 is a diagram illustrating another example of layout information of an electronic apparatus according to an example embodiment of the present disclosure.

FIG. 8 is a diagram illustrating another example of layout information of an electronic apparatus according to an example embodiment of the present disclosure. Specifically, FIG. 8 illustrates an example of layout information (e.g., the second layout information of FIG. 5) different from that of FIG. 7.

Referring to FIG. 8, layout information may include information for displaying content 810 related to a first application and content 820 related to a second application left and right when a size of the display is a second size. Here, the second size of the display may correspond to a size of the display after expansion but not be limited thereto.

If the size of the display is different from the second size when an input for displaying the content 810 related to the first application and the content 820 related to the second application is received, the electronic apparatus may control the size of the display to be the second size based on the layout information and display the content 810 related to the first application and the content 820 related to the second application as illustrated in the drawing.

Figure 9:
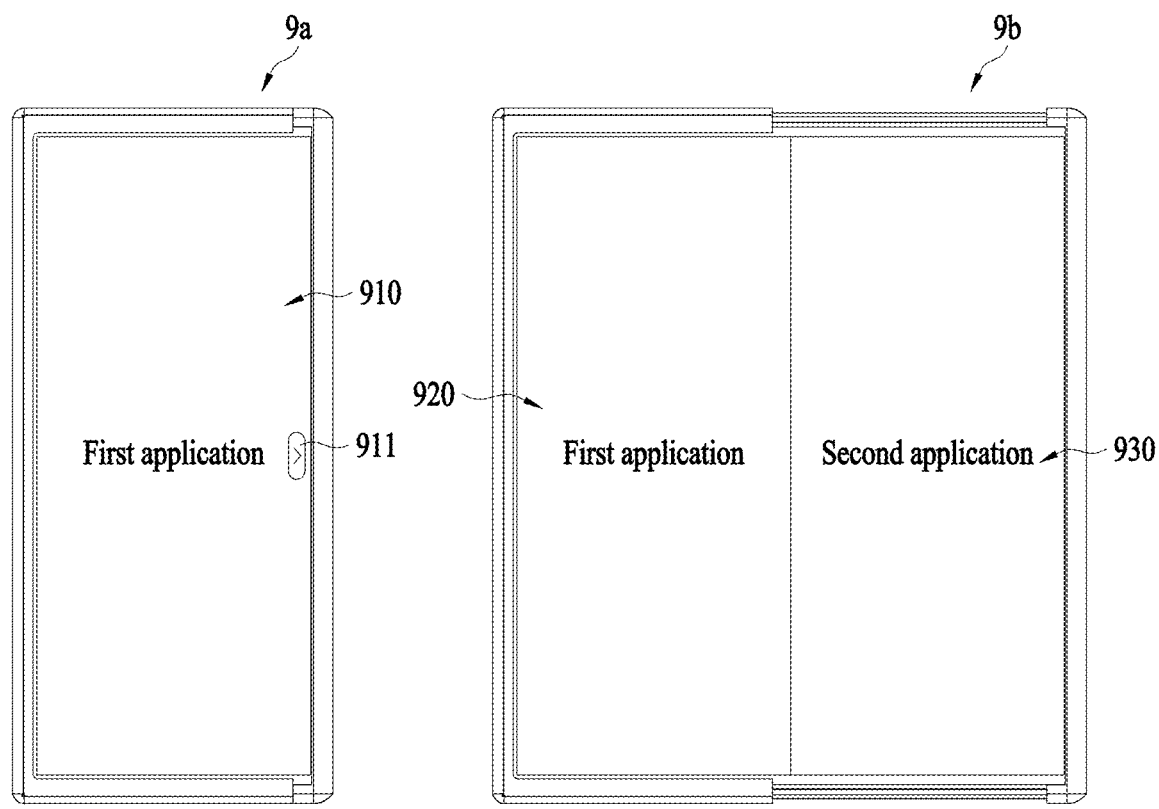
FIG. 9 is a diagram illustrating another example of layout information of an electronic apparatus according to an example embodiment of the present disclosure.

FIG. 9 is a diagram illustrating another example of layout information of an electronic apparatus according to an example embodiment of the present disclosure. Specifically, FIG. 9 illustrates an example of layout information (e.g., the third layout information of FIG. 5) different from that of FIG. 7 or 8.

Referring to FIG. 9, layout information may include information for displaying content 910 related to a first application when a size of a display is a first size and displaying content 920 related to the first application and content 930 related to a second application when a size of the display is a second size.

Reference numeral 9a represents an example of a screen displayed based on the layout information when the size of the display is the first size. Reference numeral 9b represents an example of a screen displayed based on the layout information when the size of the display is the second size.

In the example embodiment, a display expansion may be performed based on an input to a predetermined icon, for example, an icon 911 but not limited thereto.

FIG. 10 is a diagram illustrating an example of a screen for selecting an application related to content displayed based on layout information in an electronic apparatus according to an example embodiment of the present disclosure.

FIG. 10 illustrates a screen for selecting an application to be included in an application set along with a first application (hereinafter, also referred to as "app-selecting screen") in response to a predetermined input being applied. The predetermined input may include, for example, a long-touch input to an icon corresponding to the first application.

The app-selecting screen may provide information on a variety of applications related to the first application. For example, an application including a history of past uses with the first application may be included but not be limited thereto.

At least one application may be selected based on application information provided on the app-selecting screen. In this case, the application set may be determined to include the selected at least one application and the first application.

For example, icons representing applications may be arranged on the app-selecting screen as information on the applications as shown in the drawing. Among the icons, an icon 1010 corresponding to a second application and an icon 1020 corresponding to a third application may be selected. When an input for confirming a selection is applied by a user to a predetermined area 1030 corresponding to the input, the first application, the second application, and the third application may be determined to be an application set.

Figure 11:
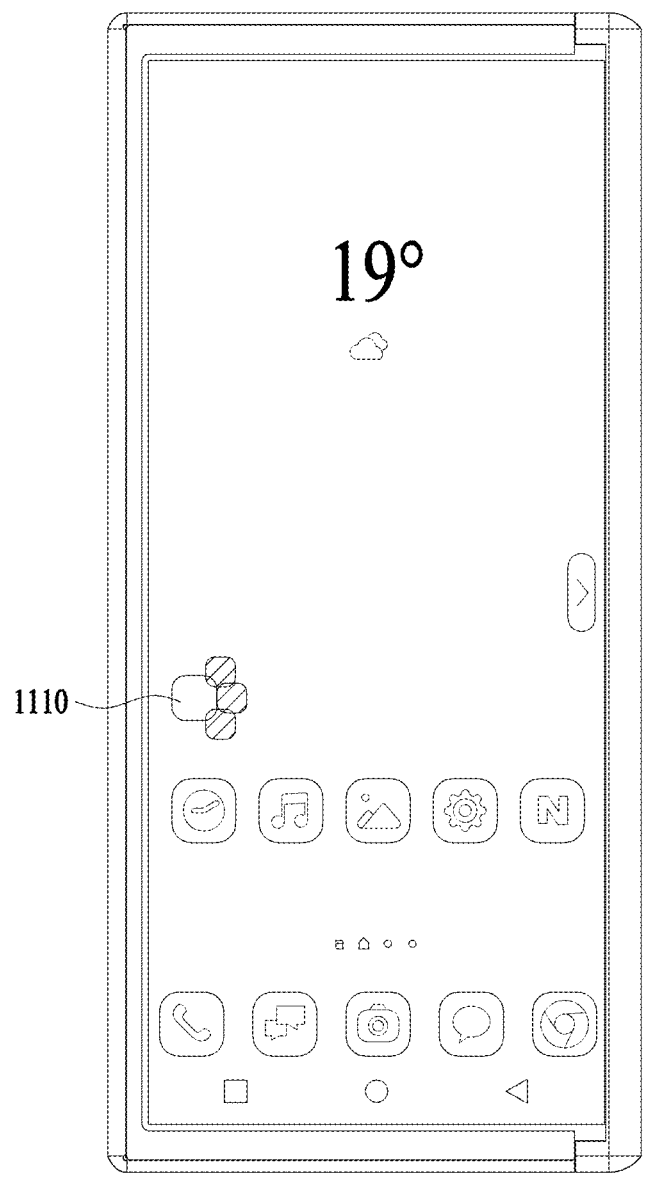
FIG. 11 is a diagram illustrating an example of an icon provided in an electronic apparatus according to an example embodiment of the present disclosure.

FIG. 11 illustrates an example of an icon provided in an electronic apparatus according to an example embodiment of the present disclosure.

Referring to FIG. 11, a first icon 1110 may be displayed on a display based on an application set being determined. The first icon 1110 may include images representing applications included in the application set.

As shown in the drawing, a main application may be represented by a relatively large square image and sub-applications may be represented by relatively small square images.

However, embodiments are not limited thereto. For example, the first icon 1110 may be presented to contain images of icons respectively corresponding to the applications.

Although not shown, when a plurality of application sets is provided, icons respectively representing the application sets may be displayed on the display. For example, a second icon different from the first icon 1110 may be displayed additionally.

In some cases, the first icon 1110 may be an icon that replaces an icon corresponding to the main application. In such cases, the icon representing the main application may be changed to the first icon 1110.

Figure 12:
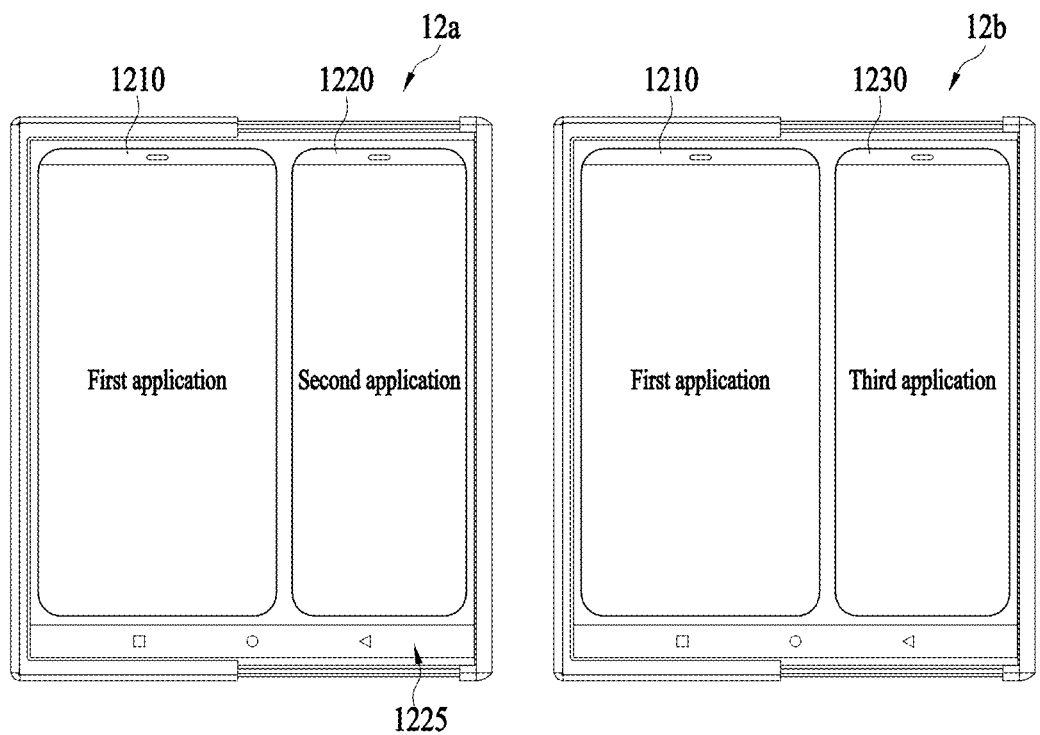
FIG. 12 is a diagram illustrating an example of layout information switched between applications in an electronic apparatus according to an example embodiment of the present disclosure.

FIG. 12 illustrates an example of layout information switched between applications in an electronic apparatus according to an example embodiment of the present disclosure. Specifically, FIG. 12 illustrates an example of providing content corresponding to an application when three or more applications are included in an application set and layout information is associated with two applications among the three or more applications.

As represented by reference numeral 12a, when an application set includes three or more applications, content 1210 of a first application corresponding to a main application and content 1220 of an application selected as a second application from sub-applications may be displayed.

In the example embodiment, the layout information may include information for displaying content of two applications, that is, a main application and a sub-application. When the application set includes three or more applications, the electronic apparatus may select one of the sub-applications as a second application.

Various criteria for selecting the second application may be used. For example, the second application may be selected from the sub-applications based on at least one of an execution time corresponding to the first application and a number of execution times corresponding to the first application.

Specifically, as an example, the electronic apparatus may select an application corresponding to the longest execution time in which the application is executed in parallel with the first application, from the sub-applications as the second application. As another example, the electronic apparatus may select an application corresponding to the largest number of execution times that the application is executed in parallel with the first application, from the sub-applications as the second application.

When the content 1220 of the second application selected from the sub-applications is displayed as indicated by the reference numeral 12a, the electronic apparatus may display the content 1230 of a third application (an application different from the second application among the sub-applications) based on a user input as represented by reference numeral 12b.

The user input may include a predetermined input related to an area in which the content 1220 of the second application is displayed. As an example, the user input may include a double-tap input touching the area in which the content 1220 of the second application is presented, twice. As another example, the user input may include an input for selecting a predetermined icon provided in at least a portion of the display. The predetermined icon may correspond to an icon 1225 included in a bar-area presented in a lower end portion of the content 1220 of the second application but not limited thereto.

When the user input is received, as indicated by the reference numeral 12b, the content 1210 of the first application may be maintained and the content 1220 of the second application may be replaced with the content 1230 of the third application.

However, embodiments are not limited thereto. In some cases, the content of the second application and the content of the third application may be provided in parallel.

FIGS. 13 through 16 illustrate examples of layout information of an electronic apparatus according to an example embodiment of the present disclosure.

Figure 13:
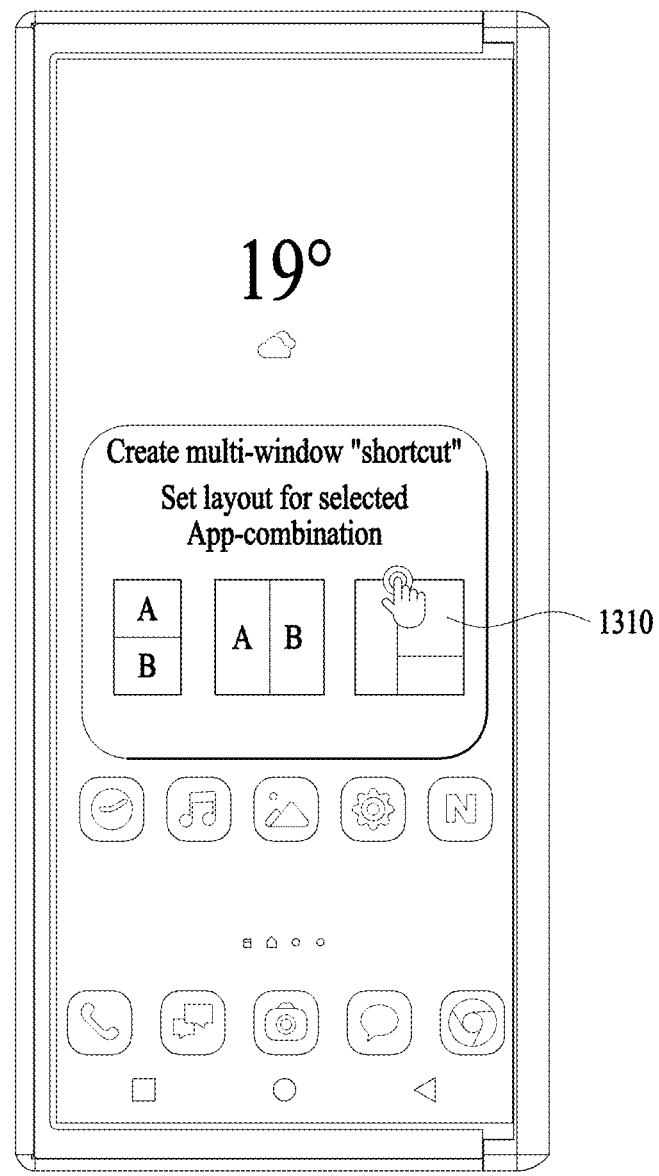
FIGS. 13 through 16 are diagrams illustrating examples of layout information of an electronic apparatus according to an example embodiment of the present disclosure.

FIG. 13 illustrates an example of a screen for selecting another example of layout information of an electronic apparatus. The layout information related to FIG. 13 may be layout information for setting a layout of content based on a user input and, hereinafter, also be referred to as fourth layout information 1310.

Referring to FIG. 13, when layout information to be provided in the electronic apparatus includes the fourth layout information 1310, the fourth layout information 1310 may be included in the screen for selecting layout information as described with reference to FIG. 4.

Although FIG. 13 illustrates a case in which the fourth layout information 1310 is displayed instead of the third layout information 430 of FIG. 4 as an example, the present example is not to be taken as being limited thereto. For example, the third layout information 430 and the fourth layout information 1310 may be provided together.

In the example embodiment, when the fourth layout information 1310 is selected as layout information to be used in the electronic apparatus, the electronic apparatus may provide a settings screen such that a layout is set based on a user setting. Examples of a screen related to a layout setting will be described in detail with reference to FIGS. 14 through 16.

The layout may be set to correspond to a requirement of the user based on the user input to the screen related to the layout setting. Through this, content of at least a portion of applications of an application set may be displayed on the display based on information on the layout set to correspond to the requirement of the user when the application set is executed thereafter.

Figure 14:
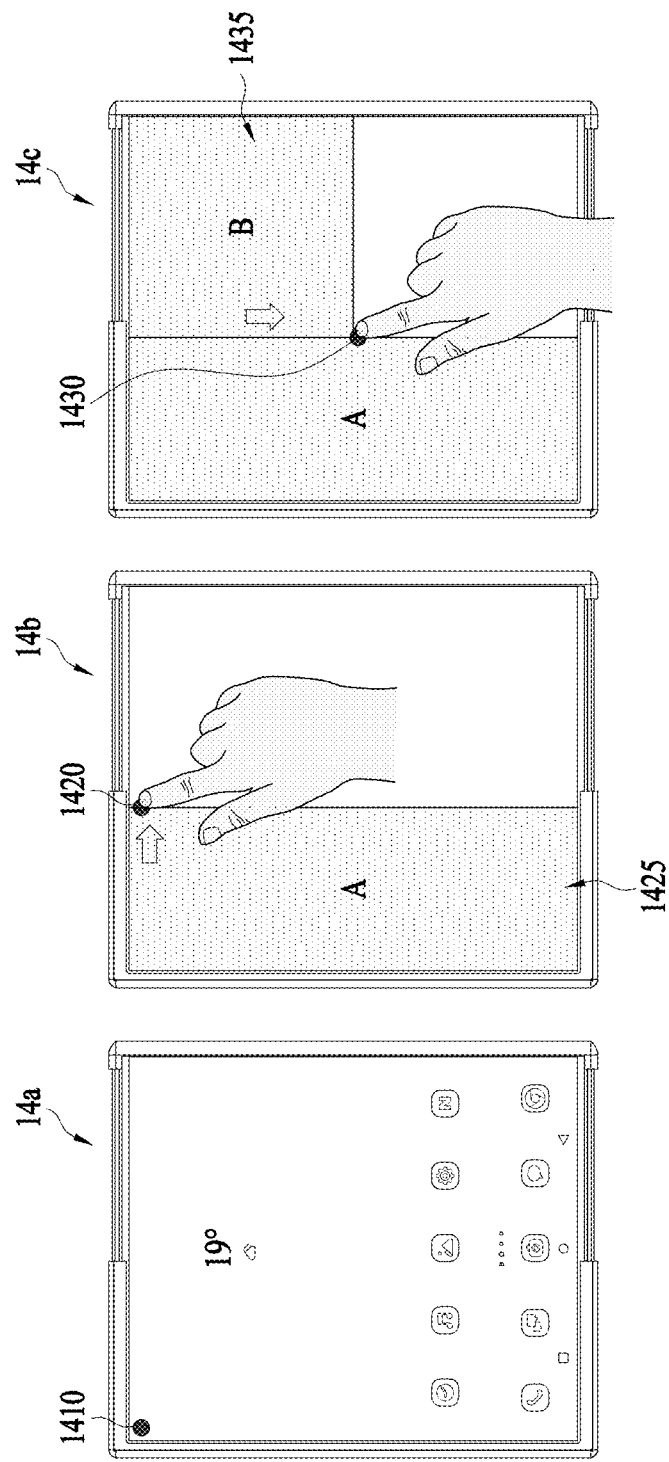

FIG. 14 illustrates an example of a screen related to a layout setting. Specifically, when fourth layout information is selected as layout information on the screen of FIG. 13, a settings screen for setting a layout may be provided as represented by reference numeral 14a.

As indicated by the reference numeral 14a, an input point moving based on a user input for layout may be displayed at a first position 1410 of the settings screen. The input point may move to correspond to the user input.

Specifically, as represented by reference numeral 14b, when a touch input (e.g., a drag input) of a user is applied to the first position 1410 corresponding to the input point and the touch input moves to a second position 1420, the input point may move to the second position 1420 based on the moved touch input.

In this instance, an area having a width corresponding to a moving length may be generated based on the moving of the input point. Here, the moving length may correspond to a distance between the first position 1410 and the second position 1420. For example, a first area 1425 of which a length of one side corresponds to the moving length of the input point may be generated.

In one example, content corresponding to the first application which is a main application may be displayed in the earliest generated first area 1425. In another example, content to be displayed in the first area 1425 may be determined based on an input of a user selecting one of applications of an application set.

Reference numeral 14C represents an example of generating a second area 1435 in which content of a second application is to be displayed. As represented by the reference numeral 14C, an input point may move to correspond to a user input moving from the second position 1420 to a third position 1430. Through this, the second area 1435 of which a length of one side corresponds to a distance between the second position 1420 and the third position 1430, that is, a moving length of the input point may be generated.

In the example embodiment, content corresponding to the second application selected based on at least one of an execution time corresponding to the first application and a number of execution times corresponding to the first application may be displayed in the second area 1435. However, embodiments are not limited thereto. In some cases, content corresponding to an application determined based on a user input may be displayed in the second area 1435.

Although not shown in detail, content corresponding to an application may be displayed in a remaining area other than the first area 1425 and the second area 1435.

In the example embodiment, an application related to content to be displayed in the remaining area may be determined based on at least one of the execution time corresponding to the first application and the number of execution times corresponding to the first application. For example, the application related to the content to be displayed in the remaining area may include an application having a longest execution time in which the application is executed in parallel with the first application, except that of the second application. However, embodiments are not limited thereto. The content to be displayed in the remaining area may be designated in advance based on a user input.

Figure 15:
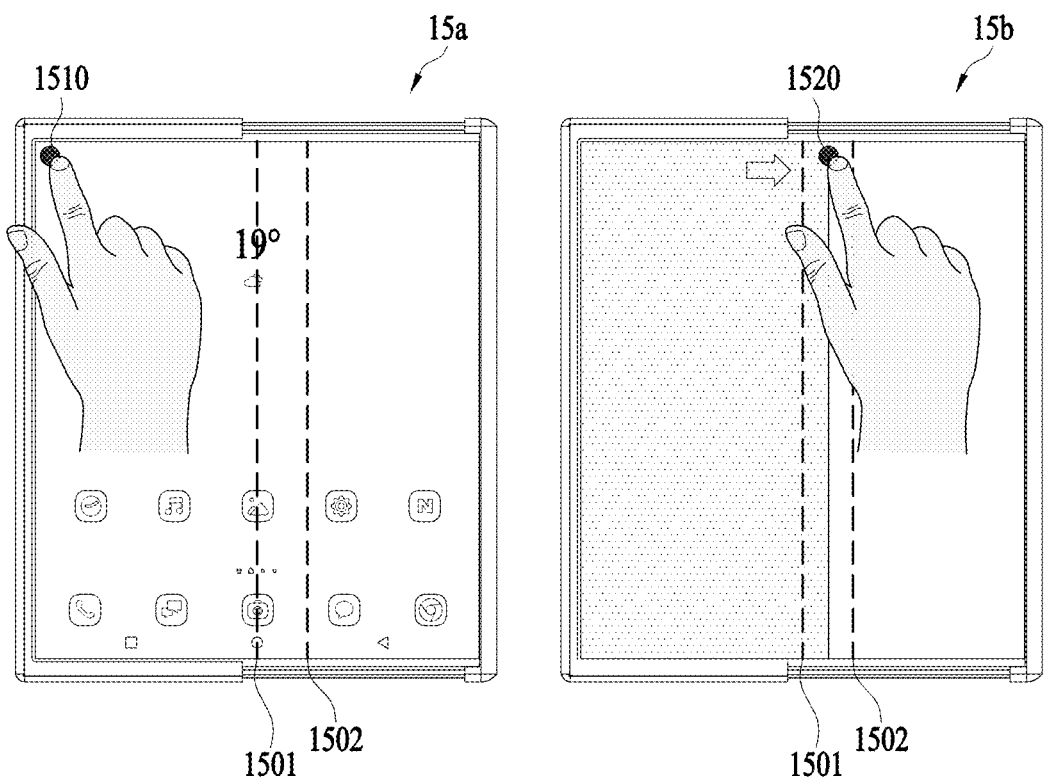

FIG. 15 illustrates an example of correcting a user input in association with fourth layout information. The fourth layout information may include information for setting a layout based on the user input.

Reference numeral 15a represents a case in which a touch input of a user is applied to an input point at a first position 1510. In the example embodiment, the electronic apparatus may provide information on a guide line related to the setting of the fourth layout information. For example, the electronic apparatus may provide information on a first guide line 1501 indicating an area in a first size and a second guide line 1502 indicating an area in a second size.

A user may use information on such guide lines to move an input point to correspond to a position of the first guide line 1501 or the second guide line 1502, thereby setting a layout.

As represented by reference numeral 15b, the input point may be at a second position 1520 between the first guide line 1501 and the second guide line 1502. In this case, the electronic apparatus may identify a first distance from the second position 1520 to the first guide line 1501 and a second distance from the second position 1520 to the second guide line 1502.

The electronic apparatus may determine a layout based on a guide line corresponding to one of the first distance and the second distance, the one being a shorter distance. For example, as represented by the reference numeral 15b, since the second position 1520 is closer to the second guide line 1502 than the first guide line 1501, an area generated based on a user input may correspond to an area of the second size generated based on the second guide line 1502.

Figure 16:
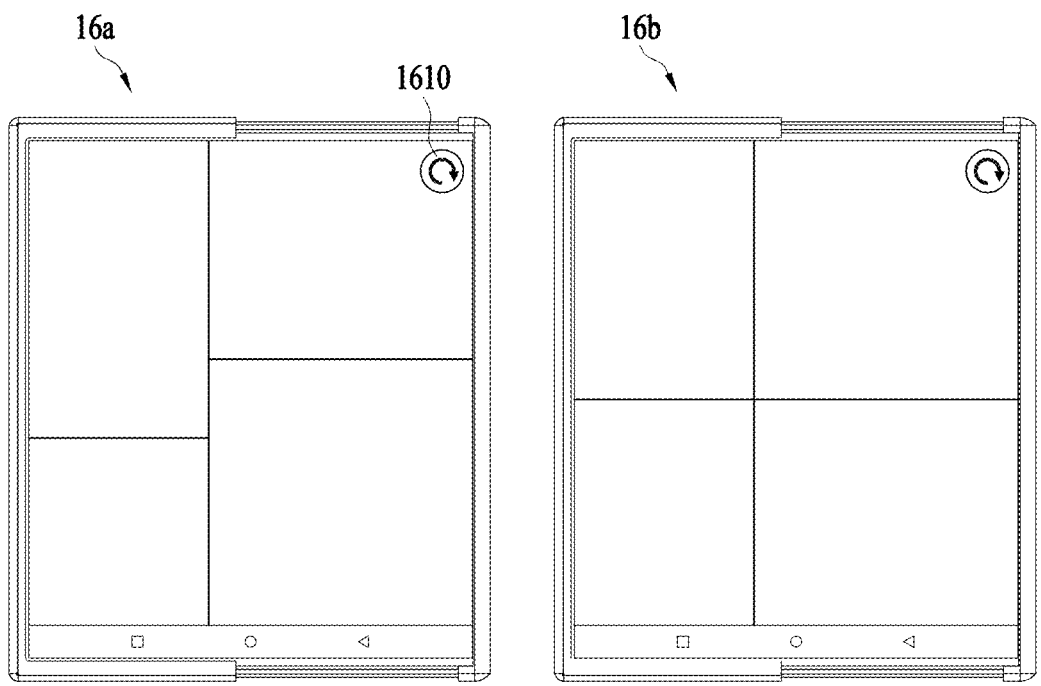

FIG. 16 illustrates another example of correcting a user input in association with fourth layout information. The fourth layout information may include information for setting a layout based on the user input.

Reference numeral 16a represents an example of a display of which an area is split based on a user input. Specifically, the reference numeral 16a represents areas separated based on an input moved by a user. In this case, the display may display a correction icon 1610 for correcting a size of an area.

In the example embodiment, when an input is applied to the correction icon 1610, a correction may be made such that a size of an area corresponds to a predetermined size as indicated by reference numeral 16b. Here, the predetermined size may be based on a size of each area being designated based on a number of split areas.

For example, when the area of the display is split into four areas, the predetermined size may include a size determined for each of the four areas. Also, when the area of the display is split into three areas, the predetermined size may include a size determined for each of the three areas.

According to example embodiments, an electronic apparatus and a control method of the electronic apparatus may more effectively provide content corresponding to at least one application of an application set based on application set information and layout information.

Also, according to example embodiments, an electronic apparatus and a control method of the electronic apparatus may display content related to a second application based on at least one of information related to a first application, for example, an execution time corresponding to the first application and a number of execution times corresponding to the first application so that the content is used with increased ease.

According to example embodiments, it is possible to provide an electronic apparatus that provides content corresponding to at least one application of an application set more effectively based on layout information and application set information, and a control method of the electronic apparatus.

Further, according to example embodiments, it is possible to display content related to a second application based on information associated with a first application such that the content is used with increased ease.

Effects are not limited to the aforementioned effects, and other effects not mentioned will be clearly understood by those skilled in the art from the description of the claims.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
    a flexible display of which at least a portion is exposed at a first side of the electronic apparatus, an area of the exposed portion being changeable; and
    a controller configured to;
        cause the flexible display to display a first icon;
        receive a first input corresponding to the first icon; and
        cause the flexible display to display content corresponding to at least one application included in an application set corresponding to the first icon based on layout information and application set information of the application set in response to the first input;
    wherein the controller is further configured to:
        expand the display exposed on the first side based on the layout information; and
        display content corresponding to at least one application of the application set in at least a portion of an area corresponding to the expanded display based on the layout information.

2. The electronic apparatus of claim 1, wherein the controller is further configured to:
    cause the flexible display to display content corresponding to a first application included in the application set based on the first input;
    expand the area of the exposed portion in response to an additional input related to display expansion; and
    cause the flexible display to display content corresponding to a second application included in the application set in at least a portion of the area corresponding to the expanded area of the exposed portion.

3. The electronic apparatus of claim 1, wherein the controller is further configured to cause the flexible display to display content corresponding to a predetermined application of the application set in response to a second input corresponding to the first icon, the second input received following the first input.

4. The electronic apparatus of claim 1, wherein:
    the application set includes a first application and a second application;
    the first application is determined based on a second input corresponding to a second icon related to the first application; and
    the second application is determined based on a third input corresponding to a user interface displayed to correspond to the second input.

5. The electronic apparatus of claim 1, wherein the controller is further configured to cause the flexible display to:
    display content corresponding to a predetermined first application included in the application set in a first area of the flexible display based on the layout information; and
    display content corresponding to a second application selected from the application set based on at least one of an execution time related to the first application or a number of execution times related to the first application, in a second area of the flexible display based on the layout information.

6. The electronic apparatus of claim 5, wherein:
the application set further includes a third application; and
the controller is further configured to cause the flexible display to display content corresponding to the third application in at least a portion of an area in which the content corresponding to the second application is displayed in response to a second input related to the second area.

7. The electronic apparatus of claim 1, wherein:
the layout information includes first layout information and second layout information; and
the controller is further configured to cause the flexible display to display the content corresponding to the at least one application of the application set based on one of the first layout information and the second layout information that corresponds to the received first input.

8. The electronic apparatus of claim 1, wherein:
the layout information includes information on a screen split based on an input to the flexible display; and
the input to the flexible display includes an input for setting a size of at least a portion of areas corresponding to the split screen.

9. The electronic apparatus of claim 8, wherein:
the input to the flexible display further includes a drag input moving from a first point to a second point; and
a size of an area of the split screen is set based on a moving length of the drag input.

10. A method for controlling an electronic apparatus comprising a flexible display of which at least a portion is exposed at a first side of the electronic apparatus, wherein an area of the exposed portion is changeable, the method comprising:
receiving a first input corresponding to a first icon;
identifying layout information and application set information of an application set corresponding to the first icon based on the first input; and
displaying, on the flexible display, content corresponding to at least one application included in the application set corresponding to the first icon based on the layout information and application set information of the application set in response to the first input,
wherein the displaying comprises:
expanding the display exposed on the first side based on the layout information; and
displaying content corresponding to at least one application of the application set in at least a portion of an area corresponding to the expanded display based on the layout information.

11. The method of claim 10, further comprising:
displaying content corresponding to a first application included in the application set on the flexible display based on the first input;
expanding the area of the exposed portion in response to an additional input related to display expansion; and
displaying content corresponding to a second application included in the application set in at least a portion of the area corresponding to the expanded area of the exposed portion.

12. The control method of claim 10, further comprising displaying content corresponding to a predetermined application of the application set on the flexible display in response to a second input corresponding to the first icon, the second input received following the first input.

13. The method of claim 10, wherein:
the application set includes a first application and a second application;
the first application is determined based on a second input corresponding to a second icon related to the first application; and
the second application is determined based on a third input corresponding to a user interface displayed to correspond to the second input.

14. The method of claim 10, further comprising:
displaying content corresponding to a predetermined first application included in the application set in a first area of the flexible display based on the layout information; and
displaying content corresponding to a second application selected from the application set based on at least one of an execution time related to the first application or a number of execution times related to the first application, in a second area of the flexible display based on the layout information.

15. The method of claim 14, wherein:
the application set further includes a third application; and
the method further comprises displaying content corresponding to the third application in at least a portion of an area in which the content corresponding to the second application is displayed in response to a second input related to the second area.

16. The method of claim 10, wherein:
the layout information includes first layout information and second layout information and
the displaying the content comprises displaying, on the flexible display, the content corresponding to the at least one application of the application set based on one of the first layout information and the second layout information that corresponds to the received first input.

17. The method of claim 10, wherein:
the layout information includes information on a screen split based on an input to the flexible display, and
the input to the flexible display includes an input for setting a size of at least a portion of areas corresponding to the split screen.

18. The method of claim 17, wherein:
the input to the flexible display further includes a drag input moving from a first point to a second point; and
a size of an area of the split screen is set based on a moving length of the drag input.

19. The electronic apparatus of claim 1, wherein the first icon includes images representing applications included in the application set.

20. The electronic apparatus of claim 1, wherein:
the layout information and application set information are previously set to correspond to the first icon; and
the application set information includes information on combinations of a plurality of applications set to be executed in parallel; and
the layout information includes information for displaying content related to at least one of the plurality of applications indicated by the application set information.

* * * * *